Figure 4:
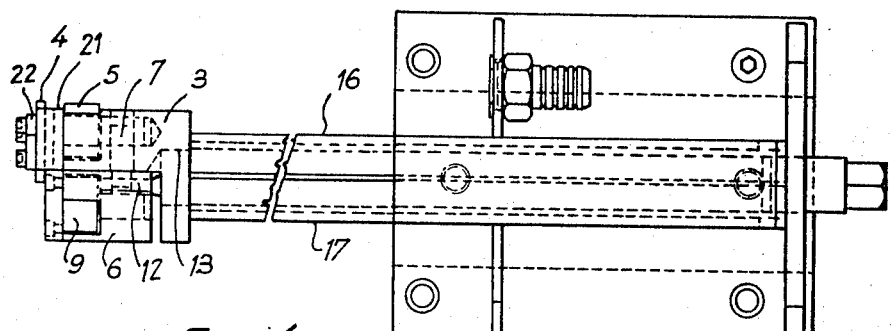

June 25, 1968   M. BERRUYER ET AL   3,389,620
APPARATUS FOR MAKING GROOVES IN DEEP BORES IN A WORKPIECE
Filed Aug. 2, 1966   4 Sheets-Sheet 1
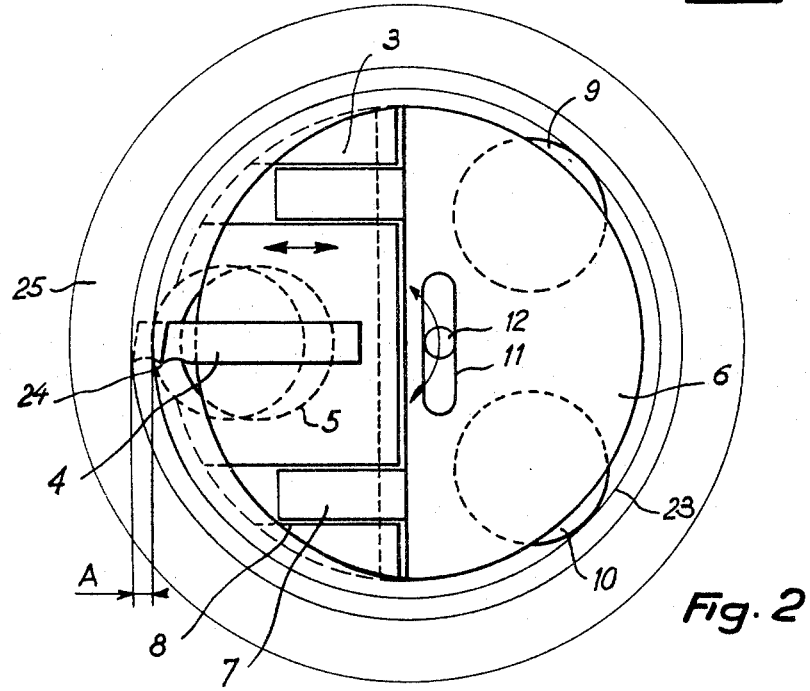
INVENTORS
MARTIAL BERRUYER
PIERRE MENISSIER
BY Bacon & Thomas
ATTORNEYS INVENTORS
MARTIAL BERRUYER
PIERRE MENISSIER
BY
Bacon & Thomas
ATTORNEYS

INVENTORS
MARTIAL BERRUYER
PIERRE MENISSIER

3,389,620
APPARATUS FOR MAKING GROOVES IN DEEP BORES IN A WORKPIECE

Martial Berruyer, Rives, Isere, and Pierre Menissier, Grenoble, Isere, France, assignors to Commissariat à l'Energie Atomique, Paris, France
Filed Aug. 2, 1966, Ser. No. 569,678
Claims priority, application France, Aug. 16, 1965, 28,433
3 Claims. (Cl. 77—3)

The present invention relates to apparatus for making grooves in deep bores in a workpiece.

For machining grooves in deep bores, particularly in tubular elements, it is known to use a fixed tool arranged inside the bore and which makes in the wall of the bore a groove when the tubular element, mounted in a mandrel, is rotated.

However, the tools used up to the present time do not allow all the desirable accuracy to be obtained.

It is the object of the present invention to enable grooves of substantially precise geometric dimensions to be made in deep bores, the limit of the depth of the groove being independent of the limits of the bore, due to the presence of a correcting device.

It is a further object of the invention that the body of a tool-holder, held rigidly in a turret on a machine tool, be centred at its other end in the bore to be machined by three support members (depending upon the diameter of the bore, the support members may be constituted by fixed flanges, or alternatively, rollers).

It is yet a further object of the invention, in order to take into account the variations in size of the bore, to provide an arrangement in which two support members are fixed to a movable support controlled by a mechanical, pneumatic, hydraulic or electrical device. This support moves parallel to the diametrical plan of the body passing through the centre of the third support member, until the support members which it carries contact the wall of the bore under a certain pressure. Under the action of this pressure, the body bends until the third support member is, in its turn, in contact with the wall of the bore.

The cutting tool is also fixed to the tool body, just in front of the fixed support member so that the cutting lip passes beyond the latter, by a length which is equal to the depth of the groove to be made. Thus, during the movement of flexion of the tool body, the cutting lip will penetrate into the part until three support members are in contact with the bore.

To fulfill these and other objects, the present invention consists in apparatus for making grooves in a deep bore in a work piece, comprising a tool-holding body constituted by a laterally deformable beam, fixed at one of its ends to a machine tool turret, and carrying at its other end a fixed support and a movable support, the fixed support being provided with a support member capable of coming into contact with the wall of the bore and with a cutting tool fixed in front of said support member and passing beyond said latter by a distance equal to that of the groove to be machined; the movable support comprising two support members on the wall of the bore, situated respectively at an equal angular distance with respect to the first fixed support member, said movable support moving parallel to the diametrical plane of the tool-holding body passing through the centre of the fixed support component under the action of drive means.

Figure 5:
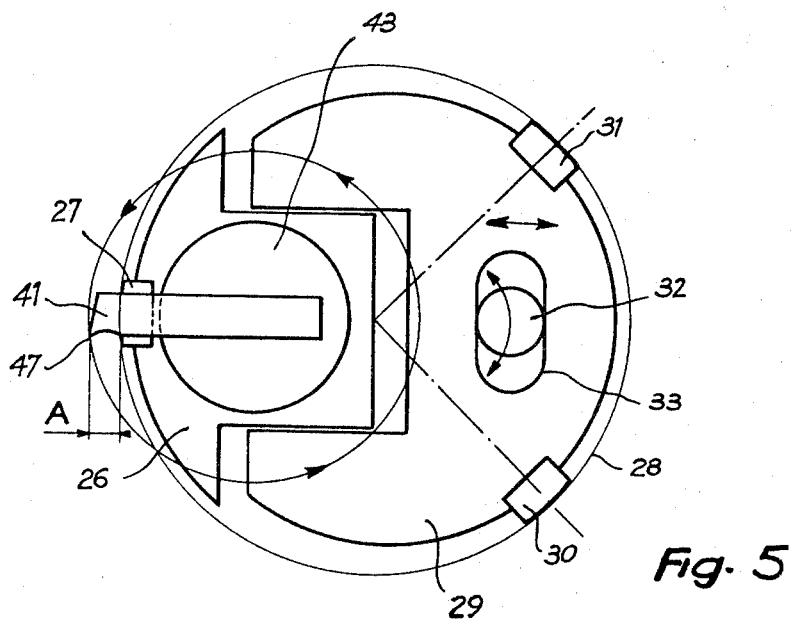
Figure 6:
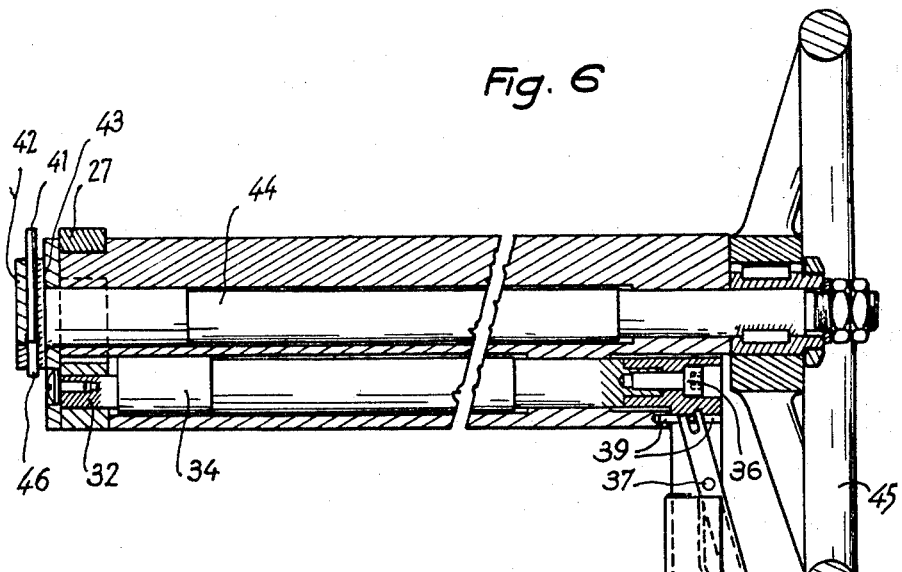
Figure 7:
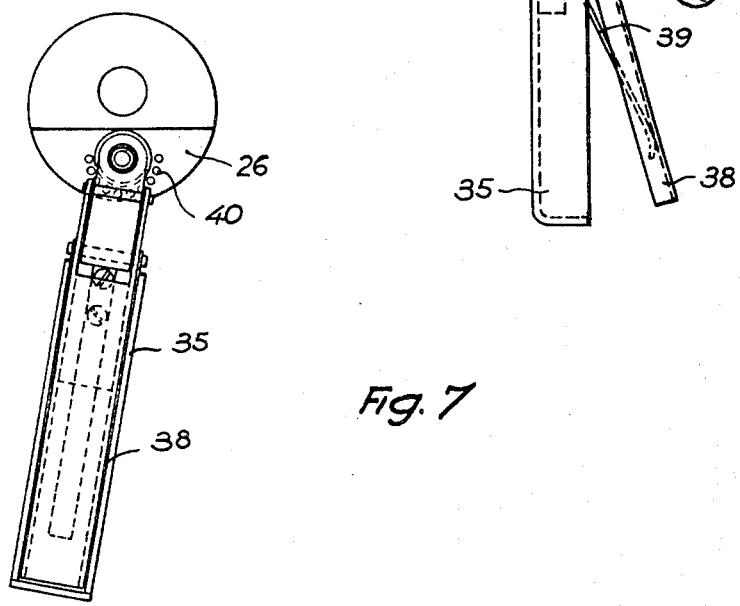
Figure 8:
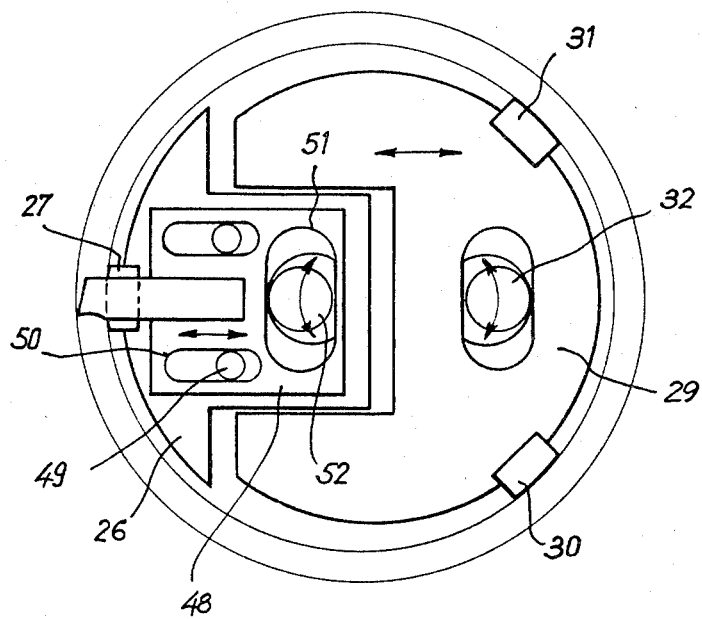

Other characteristics and advantages of the present invention will appear from the following description of certain embodiments given solely by way of examples, said description being made with reference to the accompanying drawings in which:

FIG. 1 is a diagram showing the principles of an apparatus according to the invention, FIG. 2 is a schematic view of one of the ends of the specific embodiment of such apparatus, FIG. 3 is an elevational view of the embodiment of FIG. 2, FIG. 4 is a plain of the embodiment of FIG. 2, FIG. 5 is a schematic view of one of the ends of another embodiment of apparatus according to invention, FIG. 6 is an elevational and sectional view of the embodiment of FIG. 5, FIG. 7 is a view of the other end of the embodiment shown in FIG. 5, and FIG. 8 is a schematic view of one of the ends of another embodiment of apparatus according to the invention.

Referring now to the drawings, the apparatus for making grooves in deep bores, shown schematically in FIGS. 1 and 2, is constituted by a laterally deformable beam 1, fixed at one of its ends, to a main support 2 which can be fixed to a machine tool turret (not shown in the drawing). At its other end, the beam 1 receives a fixed support 3 (FIGS. 1 and 2) on which there is mounted in a known manner a cutting tool 4 and a support member constituted by a roller 5 mounted to rotate on the support 3.

A movable support 6 engaged on the fixed support 3 by guide rods 7 arranged in bores 8 in the fixed support, moves parallel to the diametrical plan of the beam 1 passing through the centre of the support member constituted by the roller 5. The movable support 6 carries two support members constituted by two rollers 9 and 10 located respectively at an equal angular distance with respect to the roller 5.

There is provided in the movable support 6 a slot 11 in which the end of an eccentric pin 12 moves, said pin fixed to one of the ends of a transmission bar 13, mounted to rotate in the fixed support 3 and a bearing 14 fixed to the support 2 (FIGS. 2, 3 and 4). At the end opposite the pin 12, the transmission bar 13 terminates in a hexagon 15, by which the bar can be rotated by any known mechanical, pneumatic, hydraulic or electrical means to cause the pin 12 to rotate, which then moves in the slot 11 whilst ensuring that the movable support 6 guided by the rods 7 is driven.

In the embodiment of FIGS. 3 and 4, the deformable beam 1 is constituted by two U-shaped sections 16, 17 welded to the support 2 by one of their flanges, and held by welded brackets 18. The support 2 comprises screws 19 and positioning lugs 20 for fixing it to a machine tool turret. The tool 4 is clamped onto the fixed support 3 between plates 21 and 22.

For making a circular groove in a bore 23 of a tubular element 25 which is rotated (see FIG. 2), the body of the tool holder constituted by the deformable beam 1 is engaged inside said bore and the movable support 6 is displaced by means of the eccentric pin 12 and the slot 11, parallel to the diametrical plane of the beam passing through the centre of the roller 5 until the rollers 9, 10 are supported on the walls of the bore 23 under a certain pressure.

Under the action of this pressure force, the beam 1 bends, as shown in dashed lines in FIGURES 1 and 2, until the roller 5 is for its turn supported on the wall of the bore 23.

However, as the tool 4 which is fixed to the fixed support 3 and the beam 1, is arranged just in front of the roller 5 so that its cutting lip 24 passes beyond the latter by a distance A equal to the depth of the groove to be obtained, the movement of flexion of the beam 1 causes the cutting lip 24 to penetrate into the tubular element animated by a rotary movement, until the three rollers 5, 9 and 10 are supported in the bore 23. A circular groove of a depth A is thus made in the tubular element 25.

In another embodiment shown in FIGS. 5, 6 and 7 the body of the tool holder 26, which is cylindrical and deformable like the beam 1, is held rigidly at one of its ends in a machine tool turret. The other end of the body 1 carries a support member constituted by a fixed flange 27 which can come into contact with the wall of a bore 28 and a movable support 29 provided with two support members constituted by flanges 30 and 31 situated respectively at an equal angular distance from the fixed flange 27. This movable support 29 moving along the diameter passing through the centre of the fixed flange 27 is actuated by an eccentric pin 32 co-operating with a slot 33 provided in the movable support 29 and fixed at one of the ends of a transmission bar 34 mounted to rotate in the body 1. At the other end of the transmission bar 34, there is fixed by means of a screw 36, a lever 35 on which there is mounted to pivot about an axis 37 a lever 38 subjected to the action of a spring 39 which acts at one of its ends on a sliding pin 39a which can be engaged in holes 40 provided in the body 26 and which constitutes a pawl-and-ratchet mechanism permitting the bar 34 to be held under tension after the lever 35 has been actuated.

The cutting tool 41 whose thickness is equal to the width of the groove required, is fixed by means of a clamping plate 42, to a plate 43 secured to the end of a shaft 34 mounted to pivot in the body 26 and the other of which has a drive wheel 45 keyed to the shaft 44. A screw 46 for adjusting the cutting tool 41 permits the cutting edge 47 to be placed on a trajectory whose peak passes beyond the fixed flange 27 by a length equal to the depth A of the grooves to be made.

The operation of the device is identical to that of the preceding embodiment, i.e. due to the action of the two movable flanges 30, 31, the third flange 27 is always in abutment against the wall of the bore 28 to be machined. The cutting tool 41 mounted on the pivoting plate 43 is progressively engaged in the wall of the bore by rotating the drive wheel 45.

According to another embodiment of the invention shown in FIG. 8, the cutting tool 41 is fixed by a pressure plate to a movable plate 48 which moves radially, guided by pins 49 fixed to the body 26 and engaged in slots 50 provided in the plate 48. The plate 48 is also provided with a slot 51, in which there is engaged an eccentric pin 52, with respect to the shaft 44 on which it is fixed and which carries at its other end a wheel 45 as shown in FIG. 6.

On each complete revolution of the drive wheel 45 the plate 48 carrying the tool describes a to and fro movement whose amplitude is constant and equal to double the distance separating the axis of the shaft 44 and that of the eccentric pin 52.

If the tool 41 is fixed to the plate 48 so that upon the maximum amplitude of the latter the cutting edge 47 passes beyond the fixed flange by a distance equal to the depth of the groove to be obtained, the latter will easily be machined in one turn of the wheel 45.

It is understood that the device for centering by the flanges operates in the same manner as in the preceding embodiment.

It will be understood that the present invention is not limited to the embodiment described and shown but covers on the contrary all modifications thereof as defined by the appended claims.

We claim:
1. Apparatus for making a groove in a deep bore in a rotatable workpiece, comprising a tool-holder body constituted by a laterally deformable beam, fixable by one of its ends to a machine tool turret, and carrying at its other end a fixed support and a movable support, said fixed support being provided with a support member capable of being brought into contact with the wall of the bore, in which said groove is to be machined, and with a cutting tool fixed in front of said support member and passing beyond said latter by a distance equal to that of the depth of the groove to be machined, said movable support comprising two support members on the wall of said bore situated respectively at an equal angular distance with respect to said first fixed support member, said movable support being movable parallel to the diametrical plane of said tool holder body passing through the centre of the said fixed support member by a drive means.

2. Apparatus according to claim 1, wherein said support members are constituted by rollers mounted to rotate on said fixed and movable supports respectively.

3. Apparatus according to claim 1, wherein said support members are constituted by flanges fixed to said fixed and movable supports respectively.

References Cited

FOREIGN PATENTS 1,453,986  8/1966  France.

GERALD A. DOST, *Primary Examiner.*